(12) United States Patent
Ott

(10) Patent No.: US 6,769,005 B1
(45) Date of Patent: Jul. 27, 2004

(54) METHOD AND APPARATUS FOR PRIORITY RESOLUTION

(75) Inventor: Michael Ott, Pleasanton, CA (US)

(73) Assignee: Silicon Access Networks, San Jose, CA (US)

( * ) Notice: Subject to any disclaimer, the term of this patent is extended or adjusted under 35 U.S.C. 154(b) by 326 days.

(21) Appl. No.: 09/782,637

(22) Filed: Feb. 13, 2001

(51) Int. Cl.[7] .............................................. G06F 15/00
(52) U.S. Cl. ...................................................... 708/207
(58) Field of Search ........................ 708/207; 340/146.2

(56) References Cited

U.S. PATENT DOCUMENTS

| | | | | | |
|---|---|---|---|---|---|
| 4,446,452 A | * | 5/1984 | Munter | ........................ | 708/207 |
| 4,539,549 A | * | 9/1985 | Hong et al. | ................. | 708/207 |
| 4,998,219 A | * | 3/1991 | Frauenglass | ................ | 708/207 |
| 5,122,979 A | * | 6/1992 | Culverhouse | ............... | 708/207 |
| 5,262,969 A | * | 11/1993 | Ishihara | ....................... | 708/207 |
| 5,721,809 A | * | 2/1998 | Park | ............................ | 708/207 |
| 5,726,923 A | * | 3/1998 | Okumura et al. | ........... | 708/207 |
| 6,446,101 B1 | * | 9/2002 | Braun | ......................... | 708/207 |

* cited by examiner

Primary Examiner—Tan V. Mai
(74) Attorney, Agent, or Firm—Fernandez & Associates, LLP; Dennis S. Fernandez

(57) ABSTRACT

A method and apparatus for resolving priority among a plurality of data values. The priority resolution method of the invention analyzes the data values one bit at a time, starting from the most significant bit. In one embodiment, at an initial analysis step, the method determines whether the most significant bits of the data values are asserted. If at least one of the most significant bits is asserted, the data values that have unasserted most significant bits are eliminated from consideration. If none of the most significant bits is asserted, none of the data values will be eliminated at the initial step. The same analysis steps are repeated for each successive bit until only the largest data values remain. The priority resolution method of the present invention may be used to determine the smallest data value. In that embodiment, the data values are first bit-wise inverted.

15 Claims, 9 Drawing Sheets

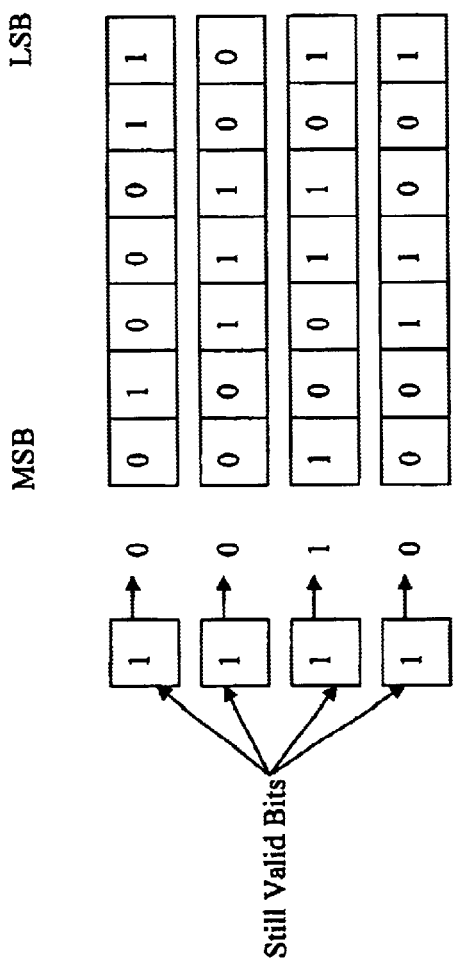
Figure 5B
Figure 5C

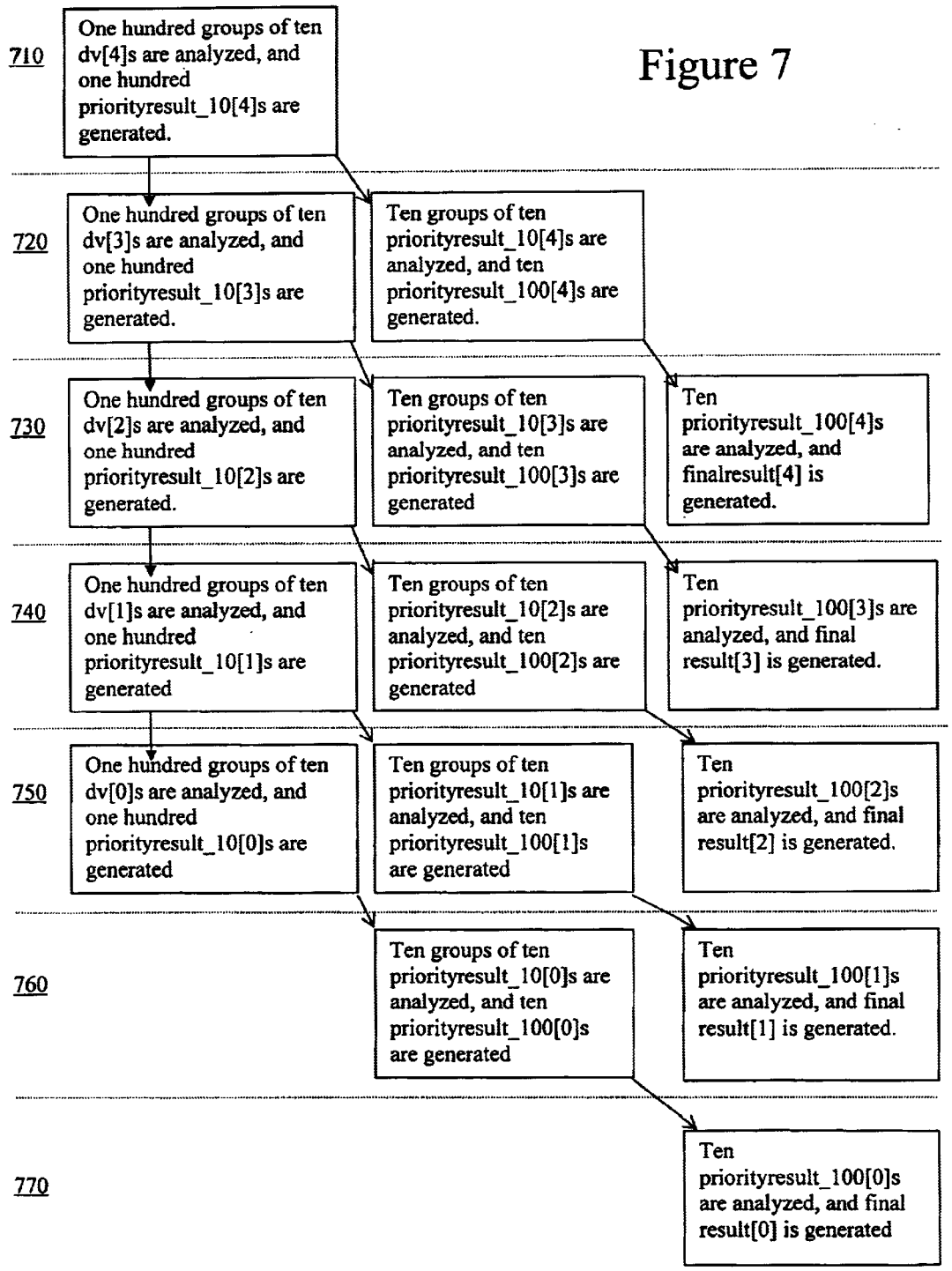

METHOD AND APPARATUS FOR PRIORITY RESOLUTION

FIELD OF THE INVENTION

The present invention pertains generally to the field of computer hardware. More specifically, the present invention pertains to a method and apparatus for resolving priorities among a number of data values.

BACKGROUND OF THE INVENTION

In a computer network, data are typically transferred in data structures referred to as "packets." A packet can travel through network according to information included within the packet header. Network routers and switches can receive packets, and process the packet according to the header information. Typical routers and switches carry out the packet routing and switching functions by a matching the header (or portions of the header) to a number of entries. If the header matches an entry, an indication (e.g., a MATCH signal) will be generated. The match indication can be used by the routers and switches to determine the packet's destination and the manner to which the packet should be processed.

One type of device that is particularly useful for performing the "matching" function is the content addressable memory (CAM). The main advantage of a CAM device is that the entire CAM can be searched in a single clock cycle. The input signal to the CAM would be a bit string representation of the data being searched for in the CAM. The outputs would be a MATCH signal indicating whether the data are found, and the address of the CAM where the matching data is located. If matching data is found in multiple addresses the CAM may also generate priority data indicative of the relative importance and priority of the addresses.

Given a large number of addresses, each having an assigned priority, the determination of which of those addresses has the highest priority is difficult.

According to one embodiment, the larger the data value, the higher the priority. Thus, the largest data value corresponds to the highest priority value.

The brute force approach is to compare address priorities two at a time. For a thousand possible priority values, the first step would require five hundred comparators. The lower priority value of each pair would be tossed aside, and the higher priority value would be passed on to the next step. This shrinking cone of comparators would continue until the highest priority address is left. This method, while straightforward, requires an increasingly large number of comparators as the number of address priorities to be compared increases.

SUMMARY OF THE DISCLOSURE

In summary, a method and apparatus for resolving priority among a plurality of data values is disclosed. The priority resolution method of the present invention does not compare the data values two at a time. Furthermore, the priority resolution method of the present invention does not require an increasingly large number of comparators as the number of data values to be compared increases.

The priority resolution method of the invention analyzes the data values one bit-position at a time, starting from the most significant bit. For each bit-position, the method determines whether any one of the bits at the current bit-position is asserted (e.g., the bit has a value of "1"). If at least one of the bit is asserted, the data values associated with the unasserted bits (e.g., bits having values of "0") are eliminated from consideration as the highest priority data value in the subsequent steps. If none of the bits at the current bit-position is asserted, none of the data values will be eliminated from consideration as the highest priority data value. The same steps are repeated for each successive bit until only the largest data value remains.

An embodiment of the present priority resolution method may be used to determine the smallest value among a plurality of data values. In that embodiment, the data values are first bit-wise inverted. The bit-wise inverted data values are then analyzed, one bit at a time, starting from the most significant bit, until only the largest inverted data value remains. The smallest data value is then obtained by inverting the largest inverted data value.

An apparatus in accordance with the present invention includes a circuit for resolving priorities among a plurality of data values. The circuit of the present embodiment includes a plurality of successive stages, each of which is configured for analyzing one bit-position of the data values. Each stage includes a circuit for receiving "still valid" bits from a previous stage, a circuit for determining whether the data bits at the bit-position are asserted, and a circuit for generating "still valid" bits for the next stage. In the present embodiment, the "still valid" bits indicate that the associated data values are still valid. That is, if a data value's "still valid" bit is asserted, then it can be determined that the data value has not been eliminated for consideration as the highest priority data value by a previous stage. Data values are eliminated from consideration one stage at a time until the largest data value is left.

Embodiments of the present invention include the above and further include a circuit for resolving highest priority amongst a plurality of data values. The circuit includes: a first stage for receiving the first highest priority bits of the data values, and a second stage for receiving the second-from-highest priority bits. Particularly, the first stage includes circuitry for determining whether the first highest priority bits of the data values are asserted, and circuitry for generating "still valid" signals associated with the data values having asserted highest priority bits. The second stage receives the "still valid" bits generated by the first stage, and includes circuitry for determining whether the second-from-highest priority bits of the data values associated with the "still valid" signals are asserted. The second stage also has circuitry for generating "still valid" signals associated with the data values not eliminated by the first stage and having asserted second-from-highest priority bits. The "still valid" signals are then used by a subsequent stage to further eliminate data values from consideration.

BRIEF DESCRIPTION OF THE DRAWINGS

The accompanying drawings, which are incorporated in and form a part of this specification, illustrate embodiments of the present invention and, together with the description, serve to explain the principles of the invention.

FIGS. 5A–5C illustrate steps of an exemplary priority resolution process for resolving priorities among several address priority values in accordance with another embodiment of the invention.

FIG. 7 is a flow diagram illustrating the operations of the priority resolution apparatus of FIG. 6.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures, devices, methodologies, etc., are not described in detail in order to avoid obscuring aspects of the present invention.

The present invention, in one embodiment, provides a method of resolving priorities among a number of priority values. Particularly, the priority resolution method analyzes the priority values one bit-position at a time, starting from the most significant bit (MSB). Initially, it is determined whether at least one MSB is asserted (e.g., the MSB having a value of "1"). If at least one of MSB is asserted, the priority values associated with the unasserted MSBs (e.g., MSBs having a value of "0") are eliminated from consideration at the next bit-position. If none of the MSBs is asserted, none of the priority values will be eliminated from consideration. Then, subsequently at the next bit-position, it is determined whether at least one bit at that bit-position is asserted, considering only the uneliminated (or, "still valid") priority values. If at least one bit of the "still valid" priority values at that bit-position is asserted, the still valid priority values associated with the unasserted bits are eliminated from consideration. If none of the bits is asserted, none of the still valid priority values will be eliminated from consideration. The same analysis steps are carried out for each successive bit-position until only the largest priority value remains, or until the least significant bits (LSBs) of the priority values have been analyzed. If there are multiple priority values that are equal, and are all the highest priority value, they are all considered "still valid" at the end of the analysis.

Figure 1A:
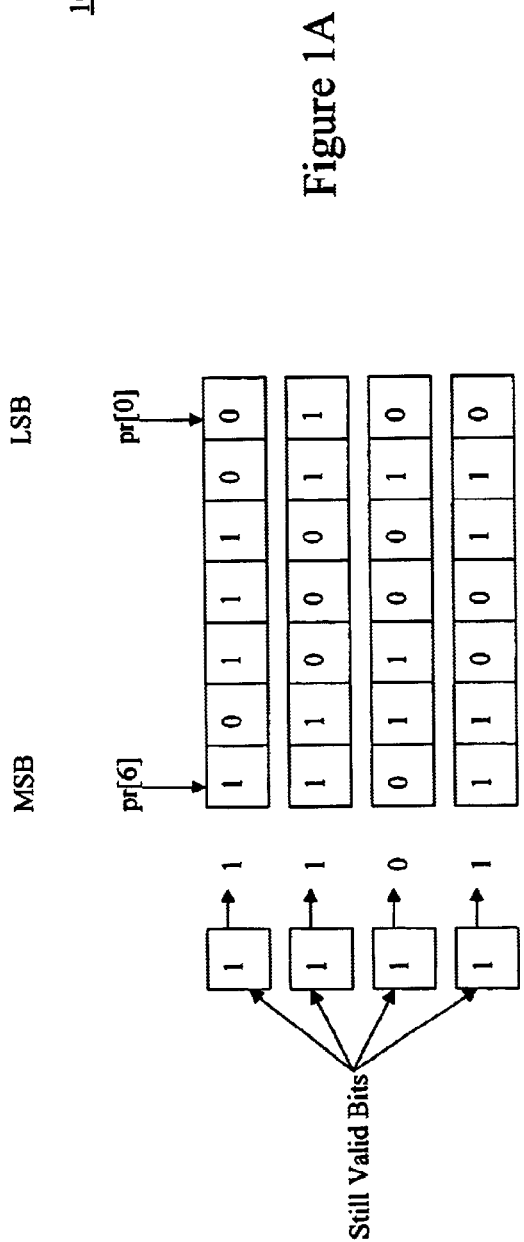
FIGS. 1A–1C illustrate steps of an exemplary priority resolution process for resolving priorities among several address priority values in accordance with one embodiment of the invention.
Figure 1B:
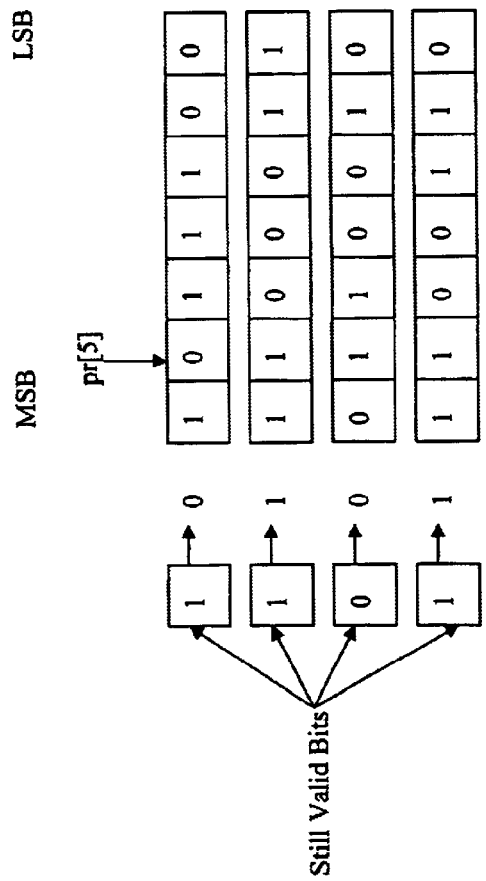
Figure 1C:
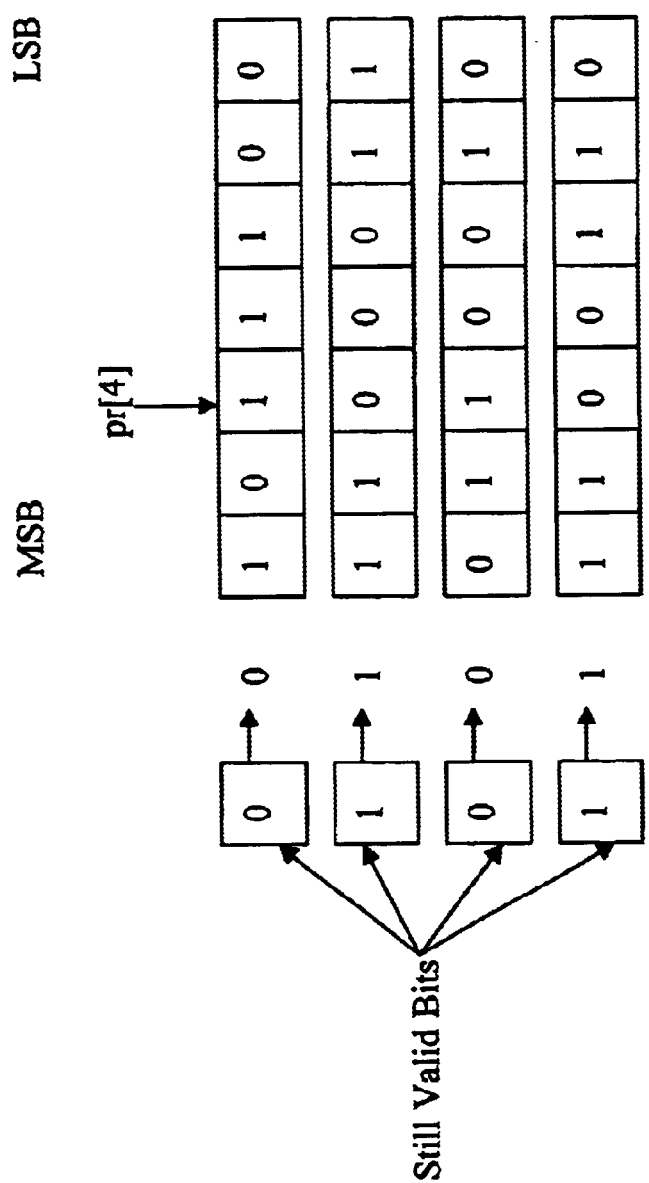

FIGS. 1A–1C illustrate steps of an exemplary priority resolution method 100 for resolving priorities among several 7-bit address priority values pr[6:0] in accordance with one embodiment of the invention. For this example, the priority values pr[6:0] to be compared are 1011100, 1100011, 0110010, and 1100110. According to the present embodiment, each priority value is also associated with a "still valid" (SV) bit that indicates its validity. Further, for simplicity, it is assumed that the initial values of the SV-bits are all set to one.

According to the present embodiment, at the first stage, the highest bits (MSBs) of the priority values (pr[6]) are logically OR-ed together. The result of this logical-OR operation indicates whether any of these bits is asserted. In other words, if the result of this logical-OR operation is one, then it can be concluded that at least one of the priority values is equal to or larger than 64 (i.e., 1000000 in binary form). In this case, any priority value whose highest bit is zero has its SV-bit set to zero, indicating that it should no longer be considered as the highest priority value. If, however, none of the-highest bits of any of the analyzed priority values is one, then all of the priority values are less than 64. Then, none of the priority values should have its SV-bit set to zero.

As illustrated in FIG. 1A, the third priority value, 0110010, of the present example is eliminated from consideration because at least one of the MSBs is one, and because the third number's MSB is zero. Thus, the SV-bit associated with the third number is set to zero.

At the second stage, the second-from-highest bit (pr[5]) of those priority values whose SV-bits equal one are logically OR-ed together. The result of this logical-OR operation indicates whether any of these second-from-highest bits is asserted. That is, if the result of this logical-OR operation is one, then it can be concluded that at least one of the still valid priority values is equal to or larger than 96 (i.e., 1100000 in binary form). If this is the case, any still valid priority value whose second-from-highest bit is zero has its SV-bit set to zero, eliminating it from consideration as the highest priority data value in the subsequent stages. If none of the second-from-highest bits of any of the analyzed priority values is one, then, none of the priority values has its SV-bit set to zero.

In the present example, as illustrated in FIG. 1B, the first priority value 1011100 is eliminated from consideration at the second stage. It should be noted that, although the second-from-highest bit pr[5] of the third number 0110010 is one, the SV-bit of the third priority value remains to be zero, since the third priority value was eliminated from consideration at the first stage.

At the third stage, the third-from-highest bit (pr[4]) of those priority values whose SV-bits equal one are logically OR-ed together. The result of this logical-OR operation indicates whether any of these third-from-highest bits is asserted. That is, if the result of this logical-OR operation is one, then it can be concluded that at least one of the priority values is equal to or larger than 112 (i.e., 1110000 in binary form). If this is the case, any priority value whose third-from-highest bit is zero has its SV-bit set to zero. This effectively eliminates the priority value from consideration at the next stage. If none of the second-from-highest bits of any of the analyzed priority values is one, then, none of the priority values has its SV-bit set to zero.

As shown in the present example, in FIG. 1C, none of the third-highest bits of the data values is one. Therefore, the SV-bits remain unchanged such that the second and fourth priority values will be considered in subsequent stages.

At the fourth stage, the fourth-from-highest bit (pr[3]) of those priority values whose SV-bits equal one are logically OR-ed together. The result of this logical-OR operation indicates whether any of these fourth-from-highest bits is asserted. That is, if the result of this logical-OR operation is one, then it can be concluded that at least one of the priority values is equal to or larger than 104 (i.e., 1101000 in binary form). If this is the case, any priority value whose fourth-from-highest bit (pr[3]) is zero has its SV-bit set to zero, indicating that it is no longer necessary to consider that priority value at the next stage. If none of the second-from-highest bits of any of the analyzed priority values is one, then, none of the priority values has its SV-bit set to zero.

At the subsequent stages (e.g., fifth, sixth and seventh stages), the priority values are eliminated one stage at a time until only the largest value(s) remain(s). In the present example, the largest priority value 1100110 can be determined at the fifth stage.

The priority resolution method of the present invention may be used to determine the smallest value amongst a number of data values. In that embodiment, the data values to be compared are first bit-wise inverted. The bit-wise inverted data values are then analyzed, one bit at a time, starting from the most significant bit, until only the largest inverted data value remains. The smallest data value is then obtained by inverting the largest inverted data value.

Figure 5A:
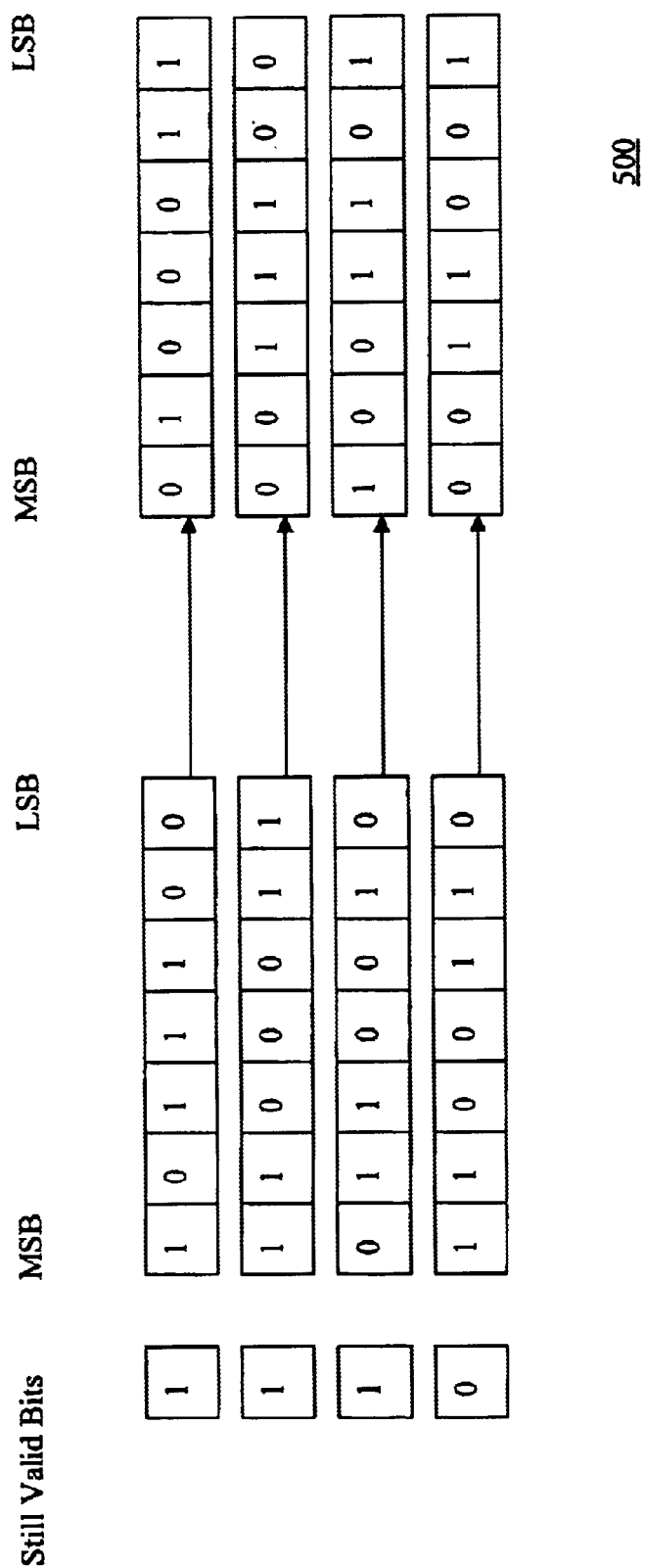

FIGS. 5A–5C illustrate steps of an exemplary priority resolution process 500 for determining a lowest priority value among several 7-bit address priority values pr[6:0] in accordance with one embodiment of the invention. For this example, the priority values pr[6:0] to be compared are 1011100, 1100011, 0110010, and 1100110. Each priority value is also associated with a "still valid" (SV) bit that indicates its validity. Further, for simplicity, it is assumed that the initial values of the SV-bits are all set to one.

As illustrated in FIG. 5A, the priority values to be compared are first bit-wise inverted. Thus, the priority values 1011100, 1100011, 0110010, and 1100110 become 0100011, 0011100, 1001101, and 0011001, respectively.

Then, as shown in FIG. 5B, the highest bits (MSBs) of the inverted priority values (-pr[6]) are logically OR-ed together. The result of this logical-OR operation indicates whether any of these highest bits is asserted. If any of these highest bits is asserted, any priority value whose highest bit is zero has its SV-bit set to zero, eliminating it from consideration at the next stage. If, however, none of the highest bits of any of the analyzed priority values is one, none of the priority values should have its SV-bit set to zero.

As illustrated in FIG. 5B, the first number, the second number and the fourth number of the present example are eliminated from consideration because the MSB of the first number is one. This means that the third number is the lowest priority value.

In FIG. 5C, the third number 1001101 is bit-wise inverted again to obtain the original value, 0110010, which is indeed the smallest value amongst the initial comparands.

Figure 2:
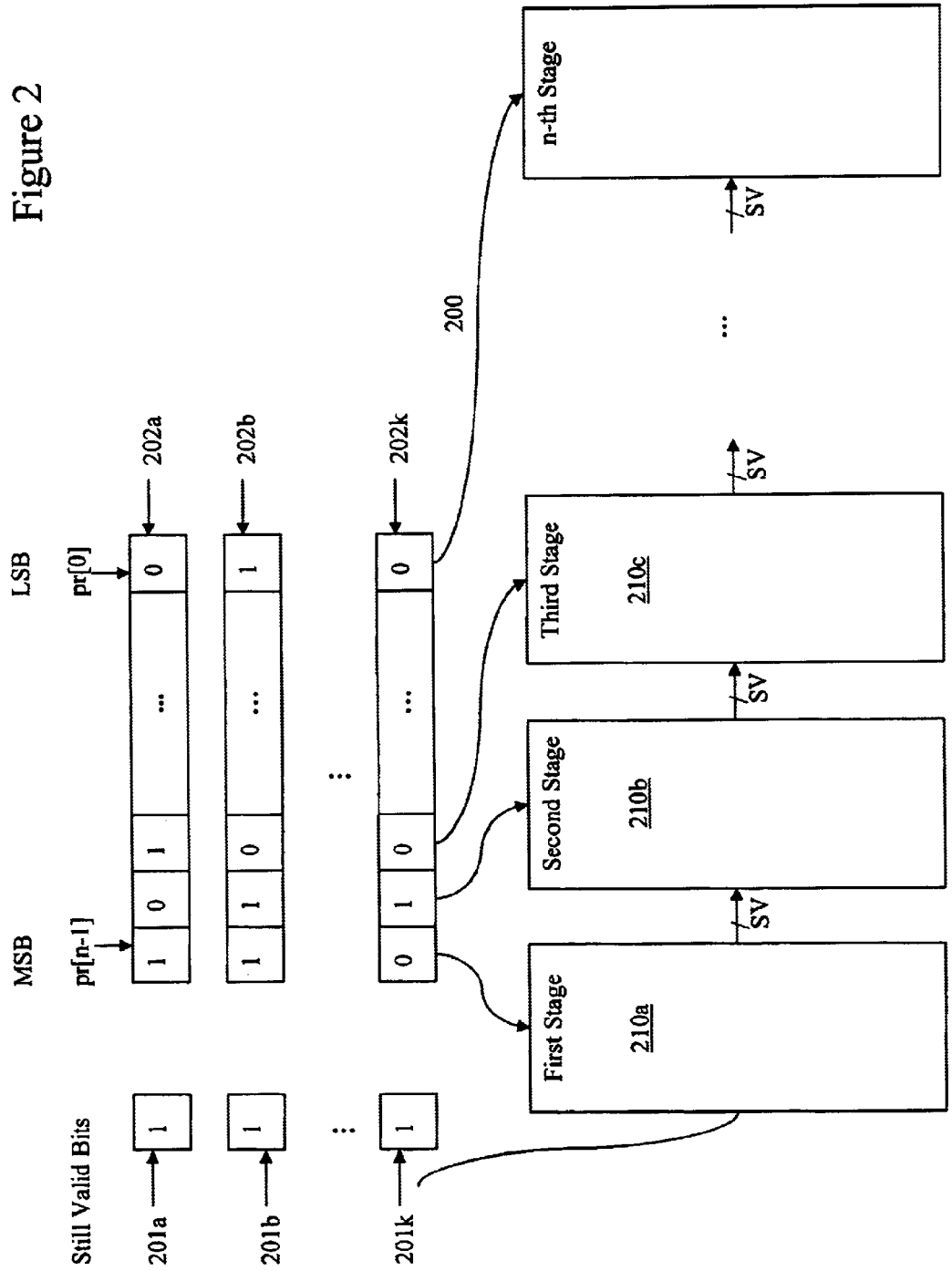
FIG. 2 is a block diagram illustrating an apparatus for priority resolution according to one embodiment of the present invention.

FIG. 2 is a block diagram illustrating a priority resolution circuit according to one embodiment of the present invention. As shown, the priority resolution circuit 200 includes a plurality of successive circuit stages 210a–210n, each of which is configured for analyzing one bit-position of priority values 202a–202k. Each of the successive circuit stages 210b–210n is configured for receiving "still valid" bits (SV-bits) from a previous circuit stage, while the first circuit stage 210a is configured for receiving SV-bits from an external source.

With reference still to FIG. 2, each circuit stage 210a–210n analyzes a bit-position of the priority values corresponding to a relative position of the circuit stage within the priority resolution circuit 200. For example, the first stage 210a analyzes the first highest bits, and the second stage 210b analyzes the second highest bits, etc. Furthermore, each circuit stage 210a–210n includes circuitry that determines whether the data values 202a–202k have asserted bits at the corresponding bit-position. Each circuit stage 210a–210n also includes circuitry for generating "still valid" signals associated with the priority values not eliminated in previous stages and having asserted bits at the corresponding bit-position.

Figure 3:
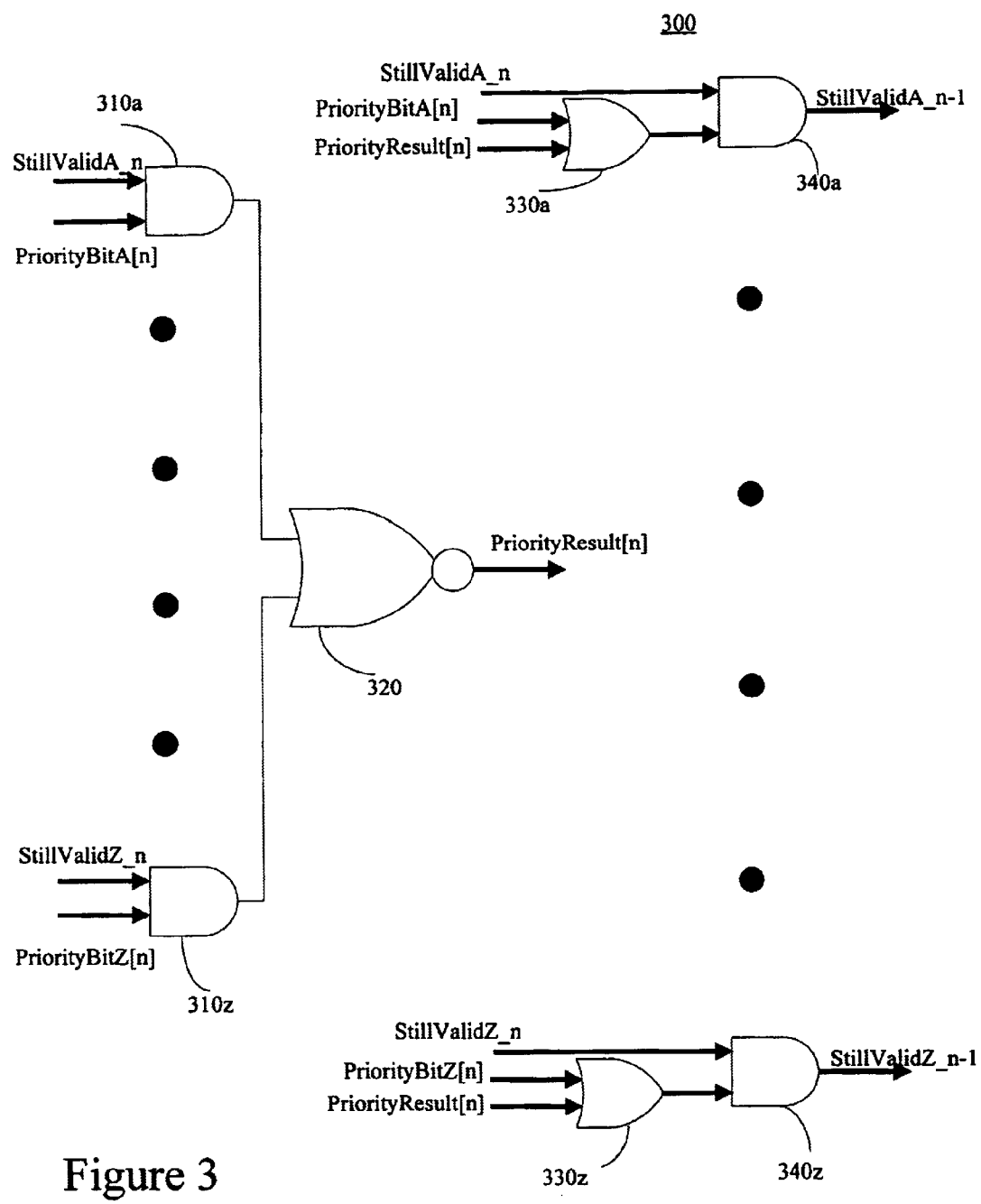
FIG. 3 is a block diagram illustrating an implementation of a stage of the priority resolution apparatus of FIG. 2.

FIG. 3 is a block diagram 300 illustrating an implementation of a circuit stage (e.g., stage 210b) in accordance with one embodiment of the invention. The circuit stage 300 of the illustrated embodiment is operable for receiving the n-th bits of priority values A–Z (PriorityBitA[n] to PriorityBitZ [n]), and for generating "still valid" bits (SV-bits) for output to the next circuit stage (e.g., stage 210c) where the (n−1)-th bits of the priority values A–Z (PriorityBitA[n−1] to PriorityBitZ[n−1]) are analyzed. In particular, circuit stage 300 includes AND-gates 310a–310z each having inputs for receiving a priority data bit from each of the priority values A–Z and its corresponding SV-bit. As shown, AND-gate 310a receives the "still valid" bit StillValidA_n from a previous circuit stage, and PriorityBitA[n] from the priority value A. Note that multiple circuit stages similarly constructed as circuit stage 300 are cascaded together to form a priority resolution circuit (e.g., circuit 200) where each circuit stage is used for one bit-position of the values being compared.

The outputs of the AND-gates 310a–310z are provided to a NOR-gate 320, which generates the a PriorityResult[n] value indicating whether at least one of the ANDs ( PriorityBitA[n] AND StillValidA_n) to (PriorityBitZ[n] AND StillValidZ_n) is one. In the present embodiment, the PriorityResult[n] is zero if at least one of the outputs from (PriorityBitA[n] AND StillValidA_n) to (PriorityBitZ[n] AND StillValidZ_n) is one. PriorityResult[n] is one if all of the outputs from (PriorityBitA[n] AND StillValidA_n) to (PriorityBitZ[n] AND StillValidZ_n) are zero.

With reference still to FIG. 3, circuit stage 300 further includes OR-gates 330a–330z and AND-gates 340a–340z for the priority values. Specifically, each of the OR-gates 330a–330z is for performing a logical-OR operation on a corresponding priority bit and the priority result. Each of the AND-gates 340a–340z is for performing a logical-AND operation on a corresponding "still valid" bit and the output of an associated OR-gate 330a–330z. For instance, OR-gate 330a performs a logical-OR operation on PriorityBitA[n] and PriorityResult[n], and the AND-gate 340a performs a logical-AND operation on the output of the OR-gate 330a and StillValidA_n. The output of the AND-gate 340a is the value StillValidA_(n−1), which is for output to the subsequent stage.

Operations of the circuit stage 300 are summarized below in Table 1.

TABLE 1

| Still ValidA n | Priority ResultA[n] | Priority BitA[n] | StillValidA n−1 |
|---|---|---|---|
| 0 | X (don't care) | X | 0 (this value was eliminated from consideration in a previous stage) |
| 1 | 0 | X | 1 (nothing was eliminated in this stage) |
| 1 | 1 | 0 | 0 (another data value that was still valid had a one in this bit position, and so this data value was eliminated) |
| 1 | X | 1 | 1 (this data value is guaranteed to not be eliminated in this stage) |

It should be noted that, in accordance with the present invention, the value of the largest data value may be easily and conveniently determined by using PriorityResult[n]. Particularly, in the embodiment as illustrated in FIG. 3, the largest data value may be determined by bit-wise inverting all the bits of PriorityResult[n] of all the stages.

Figure 4:
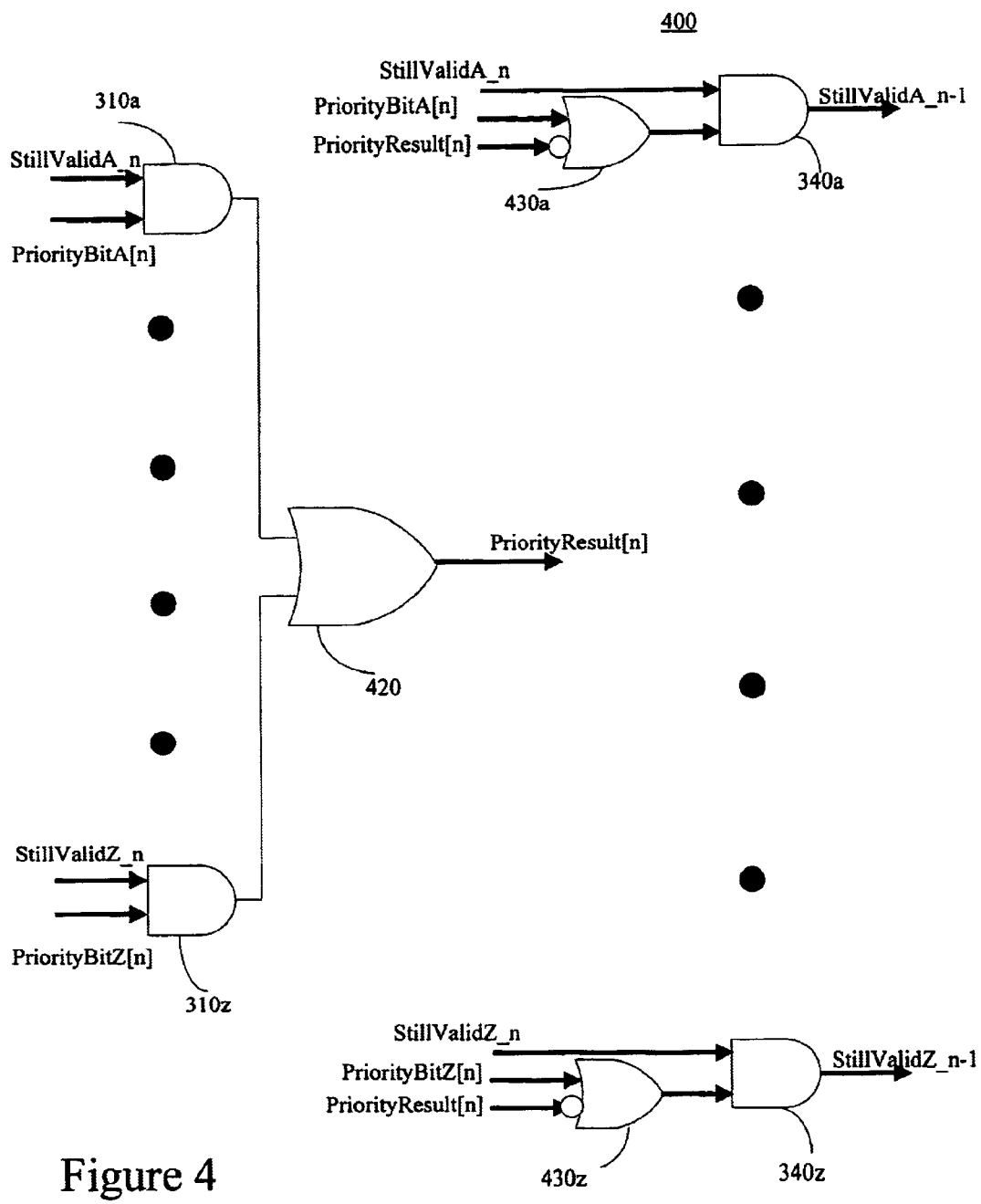
FIG. 4 is a block diagram illustrating another implementation of a stage of the priority resolution apparatus of FIG. 2.

FIG. 4 is a block diagram 400 illustrating another implementation of a circuit stage in accordance with one embodiment of the present invention. Similar to circuit stage 300, the circuit stage 400 includes AND-gates 310a–310z and AND-gates 340a–340z. However, unlike the circuit stage 300, the circuit stage 400 includes an OR-gate 420 for receiving the outputs of AND-gates 310a–310z to generate a PriorityResult[n] for this circuit stage. In addition, the circuit stage 400 includes OR-gates 430a–430z each having an inverted input for receiving PriorityResult[n]. An advantage of this embodiment is that the value of the PriorityResult[n] may be directly provided to the output the priority resolution apparatus as the largest data value.

A significant aspect of the invention is that the derivation of the highest priority value is completed serially, with the bit positions of all the values being analyzed one at a time. The result of the logical-OR (e.g., priority result[n] of circuit 400 of FIG. 4) at each stage is equal to the corresponding bit value in the highest priority value. In other words, suppose the final highest priority value is final[n], then priority_result[n] is equal to final[n].

Since the value of the MSBs of the final highest priority value are determined before the LSBs, multiple copies of this priority resolution structure can be cascaded together to quickly resolve a very large set of data values.

Figure 6:
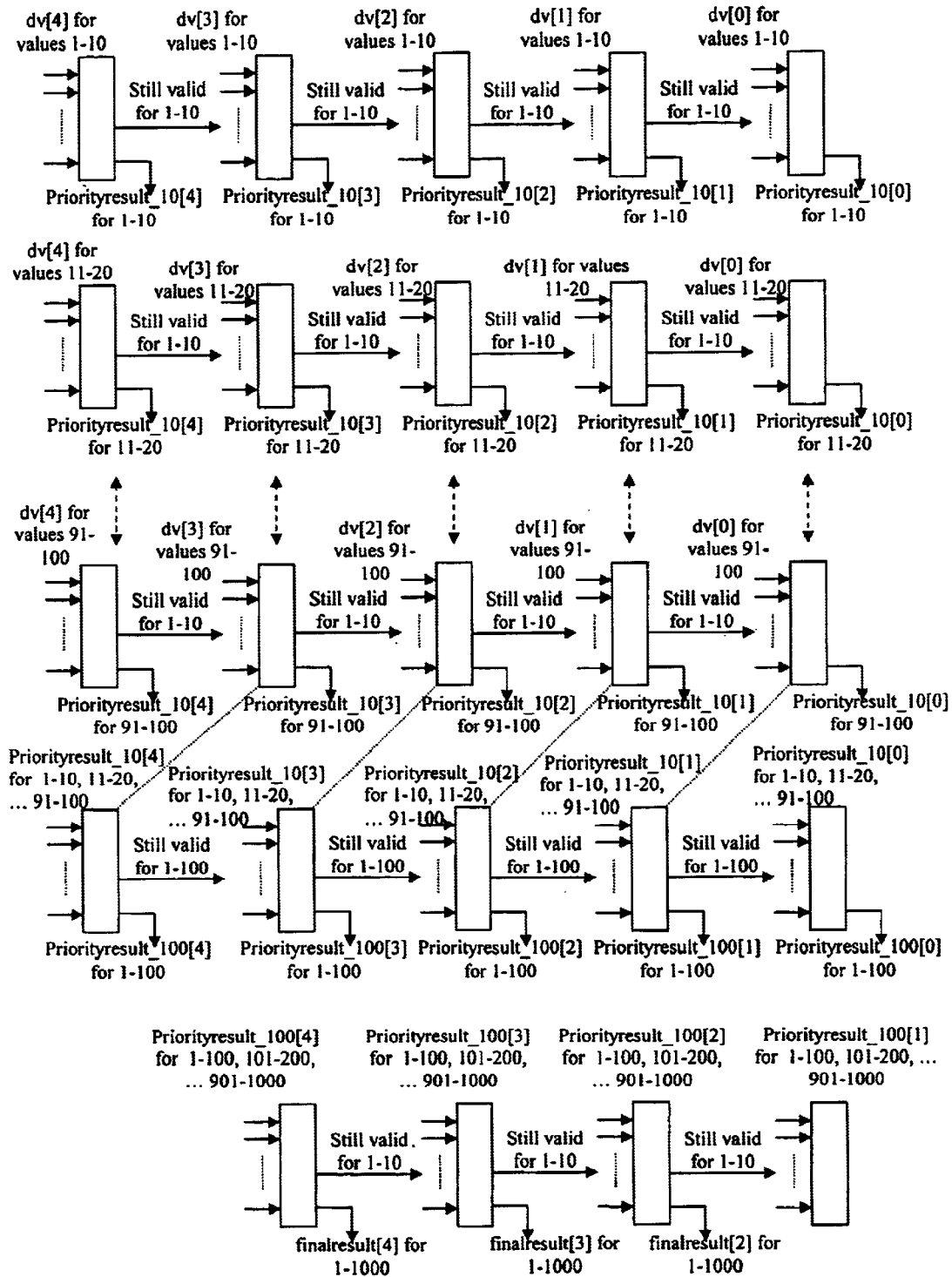
FIG. 6 is a block diagram illustrating an exemplary cascade of priority resolution apparatus in accordance with an embodiment of the present invention.

FIG. 6 is a block diagram of a cascaded priority resolution structure 600 for analyzing one thousand data values dv[n] (of five bits each dv[4:0]). As shown in FIG. 6, one thousand data values dv[4:0] are subdivided into one hundred groups of ten. Each group of ten is analyzed by a 10-bit wide priority resolution structure similar to the structure 400 of FIG. 4. Each of these one hundred 10-bit wide priority resolution structures will generate a five-bit priorityresult_10[4:0] output. In other words, there are one hundred priorityresult_10[4:0] outputs.

With reference still to FIG. 6, these one hundred five-bit priorityresult[4:0] outputs are grouped into ten groups of ten. Each group of ten is analyzed by a 10-bit wide priority resolution structure of the present invention. Each of these ten 10-bit wide priority resolution structures will create a five-bit priorityresult_100[4:0] output. Thus, there are ten five-bit priorityresult_100[4:0] outputs.

With reference still to FIG. 6, these ten priorityresult_100[4:0] outputs are analyzed by a 10-bit wide priority resolution structure of the present invention. The output of this 10-bit wide priority resolution structure will be the value of the highest priority value, finalresult[4:0].

The connection of these three cascaded levels of priority resolution allows for a very fast analysis of the original one thousand data values. FIG. 7 is a flow diagram illustrating the fast analysis process performed by the cascaded priority resolution structure 600.

As illustrated, in step 710, one hundred groups of ten dv[4]s are analyzed, and one hundred priorityresult_10[4]s are generated.

In step 720, one hundred groups of ten dv[3]s are analyzed, and one hundred priorityresult_10[3]s are generated. Simultaneously with the generation of the priorityresult_10[3]s, ten groups of ten priorityresult_10[4]s are analyzed, and ten priorityresult_100[4]s are generated.

In step 730, one hundred groups of ten dv[2]s are analyzed, and one hundred priorityresult_10[2]s are generated. Simultaneously with the generation often priorityresult_10[2]s, ten groups of ten priorityresult_10[3]s are analyzed, and ten priorityresult_100[3]s are generated. Also simultaneously ten priorityresult_100[4]s are analyzed, and finalresult[4] is generated. Note that the most significant bit of the final result finalresult[4] is generated earlier than the rest of the bits.

In step 740, one hundred groups of ten dv[1]s are analyzed, and one hundred priorityresult_10[1]s are generated. Simultaneously with the generation of the priorityresult_10[1]s, ten groups often priorityresult_10[2]s are analyzed, and ten priorityresult_100[2]s are generated. Also simultaneously with the generation of the priorityresult_10[1]s, ten priorityresult_100[3]s are analyzed, and final result[3] is generated.

In step 750, one hundred groups of ten dv[0]s are analyzed, and one hundred priorityresult_10[0]s are generated. Simultaneously with the generation of the priorityresult_10[0]s, ten groups often priorityresult_10[1]s are analyzed, and ten priorityresult_100[1]s are generated. Also simultaneously with the generation of the priorityresult_10[0]s, ten priorityresult_100[2]s are analyzed, and final result[2] is generated.

In step 760, ten groups of ten priorityresultlt_10[0]s are analyzed, and ten priorityresult_100[0]s are generated. Simultaneously with the generation of the priorityresult_100[0]s, ten priorityresult_100[1]s are analyzed, and final result[1] is generated.

In step 770, ten priorityresult_100[0]s are analyzed, and final result[0] is generated By cascading the three levels of priority resolution structures together, the final result of one thousand possible data values can thus be determined in the seven times the time necessary for one level of analysis of ten possible values.

The present invention, a method and apparatus for priority resolution, has thus been described. While the present invention has been described in particular embodiments, it should be appreciated that the present invention should not be construed as limited by such embodiments. For instance, priority resolution circuit 200 and its circuit stages may be implemented with many different logical equivalent circuits. Rather, the present should be constructed according to the claims below.

What is claimed is:

1. A method of determining a largest data value among a plurality of data values each having a first most significant bit, the method comprising:
   (a) determining whether the first most significant bits of the data values are asserted;
   (b) provided at least one of the first most significant bits is being asserted and at least one of the first most significant bits is being unasserted, eliminating from consideration all of the data values having an unasserted first most significant bit; and
   (c) repeating the (a) and (b) for a next most significant bit of each of uneliminated ones of the data values until the data values except the largest data value are eliminated.

2. The method of claim 1, wherein (a) comprises applying a logical-OR operation to the first most significant bits of the data values.

3. The method of claim 1, wherein each of the data values is associated with a valid bit, each of the valid bits indicating an associated one of the data values is eliminated from consideration when the valid bit is unasserted.

4. The method of claim 3, wherein (b) comprises unasserting a respective one of the valid bits associated with the at least one of the data values.

5. The method of claim 1, wherein (c) comprises:
   determining whether the next most significant bits of the uneliminated ones of the data values are asserted; and
   provided at least one of the next most significant bits being asserted and at least one of the next most significant bits being unasserted, eliminating from consideration all of the data values having an unasserted next most significant bit.

6. A method of determining a smallest data value among a plurality of data values each having a first most significant bit, the method comprising:

(a) inverting the plurality of data values;

(b) determining whether the first most significant bits of the inverted data values are asserted;

(c) provided at least one of the first most significant bits being asserted and at least one of the first most significant bits being unasserted, eliminating from consideration all of the inverted data values having an unasserted first most significant bit;

(d) repeating (b) and (c) for a next most significant bit of each of uneliminated ones of the inverted data values until only a last data value remains; and (e) obtaining the smallest data value by inverting the last data value.

7. The method of claim 6, wherein (b) comprises applying a logical-OR operation to the first most significant bits of the inverted data values.

8. The method of claim 6, wherein each of the inverted data values is associated with a valid bit, each of the valid bits indicating an associated one of the inverted data values is eliminated from consideration when the valid bit is unasserted.

9. The method of claim 8, wherein (b) comprises unasserting a respective one of the valid bits associated with the at least one of the inverted data values.

10. The method of claim 6, wherein (d) comprises:

determining whether the next most significant bits of the uneliminated ones of the inverted data values are asserted; and provided at least one of the next most significant bits being asserted and at last one of the next most significant bits being unasserted, eliminating from consideration all of the inverted data values having an unasserted next most significant bit.

11. A circuit for resolving priorities among a plurality of data values each having a plurality of bits, the circuit including a plurality of successive circuit stages each corresponding to one of the bits, each of the successive circuit stages comprising:

first logic circuit for receiving first valid signals from a previous one of the successive circuit stages, the first valid signals being associated with respective ones of the data values uneliminated by the previous circuit stages;

second logic circuit for determining whether corresponding ones of the bits of the respective data values are asserted; and third logic circuit for generating second valid signals for each of the respective data values having asserted corresponding bits, the second valid signals indicating to a next one of the successive circuit stages uneliminated ones of the data values.

12. The circuit of claim 11, wherein the first logic circuit comprises a plurality of AND gates each receiving a first valid signal and a corresponding priority value bit.

13. The circuit of claim 12, wherein the second logic circuit comprises a NOR gate coupled to receive outputs of the plurality of AND gates.

14. The circuit of claim 13, wherein the third logic circuit comprises:

a plurality of OR gates each receiving one of the corresponding bits and output of the NOR gate;

a plurality of AND gates each receiving an output of the plurality of OR gates and one of the first valid signals, each of the AND gates generating one of the second valid signals.

15. A circuit for resolving priorities among a plurality of data values each having a plurality of bits including a first most significant bit and a second most significant bit, the circuit comprising:

(a) a first stage for receiving the first most significant bits of the data values, the first stage including (a1) circuitry for determining whether the first most significant bits of the data values are asserted;

(a2) circuitry for generating first valid signals associated with the data values having asserted first most significant bits;

(b) a second stage for receiving the second most significant bit and the first valid signals, the second stage including (b1) circuitry for determining whether the second most significant bits of the data values having associated first valid signals are asserted;

(b2) circuitry for generating second valid signals associated with the data values having asserted second most significant bits.

* * * * *